[54] PROCESS AND APPARATUS FOR PRODUCING A DRY-PRESSED MOULDING FROM A PARTICULATE OR GRANULAR MOULDING MATERIAL

[75] Inventors: Eugen Bühler, Burtenbach; Klaus Strobel; Karl Schwarzmeier, both of Selb, all of Fed. Rep. of Germany

[73] Assignee: Eugen Bühler and Hutschenreuther AG, Selb, Fed. Rep. of Germany

[21] Appl. No.: 939,253

[22] Filed: Dec. 5, 1986

Related U.S. Application Data

[63] Continuation of Ser. No. 666,886, Oct. 31, 1984, abandoned.

[30] Foreign Application Priority Data

Oct. 31, 1983 [DE] Fed. Rep. of Germany ....... 3339487

[51] Int. Cl.⁴ .............................................. B29C 59/00

[52] U.S. Cl. .................................... 264/517; 264/119; 264/120; 425/398; 425/405.1; 425/408

[58] Field of Search ............... 264/102, 120, 294, 517, 264/571, 119, 296, 320, 325; 425/405 H, 405 R, 389, 408, 412, 394, 395, 356, 388, 398

[56] References Cited

U.S. PATENT DOCUMENTS

| | | | |
|---|---|---|---|
| 3,594,877 | 7/1971 | Suda et al. | 425/389 |
| 3,664,799 | 5/1972 | Wallick, Jr. et al. | 425/405 H |
| 4,128,375 | 12/1978 | Schubart | 425/405 H |
| 4,330,250 | 5/1982 | Pinkas | 425/389 |
| 4,378,265 | 3/1983 | Kiss | 156/242 |
| 4,473,526 | 9/1984 | Bühler | 264/517 |
| 4,501,714 | 2/1985 | Strobel et al. | 264/245 |
| 4,544,345 | 10/1985 | Bühler et al. | 425/405 R |

FOREIGN PATENT DOCUMENTS

| | | | |
|---|---|---|---|
| 0001011 | 3/1979 | European Pat. Off. | 425/405 R |
| 0043019 | 1/1982 | European Pat. Off. | 425/405 H |
| 0043140 | 1/1982 | European Pat. Off. | 425/405 |
| 2525085 | 12/1975 | Fed. Rep. of Germany | 264/120 |
| 3101236 | 1/1982 | Fed. Rep. of Germany . | |
| 3128348 | 2/1983 | Fed. Rep. of Germany . | |
| 2104438 | 3/1983 | United Kingdom | 425/405 R |

OTHER PUBLICATIONS

Apfelbeck, "Ein neuer Weg zer mechanisierten Fertigung von Tellern." Keramische zeitschrift, 14 Jahrgang, NR2, 1962.

*Primary Examiner*—Jan H. Silbaugh
*Assistant Examiner*—Mary Lynn Fertig
*Attorney, Agent, or Firm*—Toren, McGeady & Associates

[57] ABSTRACT

A process and apparatus for producing a dry-pressed molding from a particulate or granular molding material such as a ceramic molding composition in which the composition is initially drawn into a loading cavity by applying a vacuum thereto. The loading cavity is formed by a first mold half and a shooting head having a molding surface the shape of which determines the shape of a premolding which is formed upon entry of the composition into the loading cavity and sufficiently compressed to retain its shape after the shooting head has been removed to allow a second mold half to be positioned over the first mold half. The shape of the part of the premolding formed by the shooting head molding surface differs from that of the second mold half in such a way that, on final pressing, the compression starts in the areas of relatively greater thickness of the premolding before it starts in the areas of relatively smaller thickness so that the compression ratio is maintained approximately constant over the whole of the area of the molding.

5 Claims, 3 Drawing Sheets

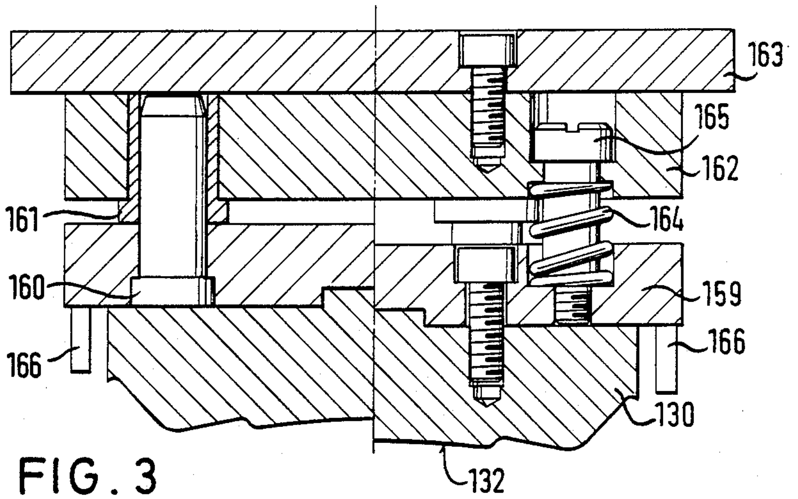
FIG. 3
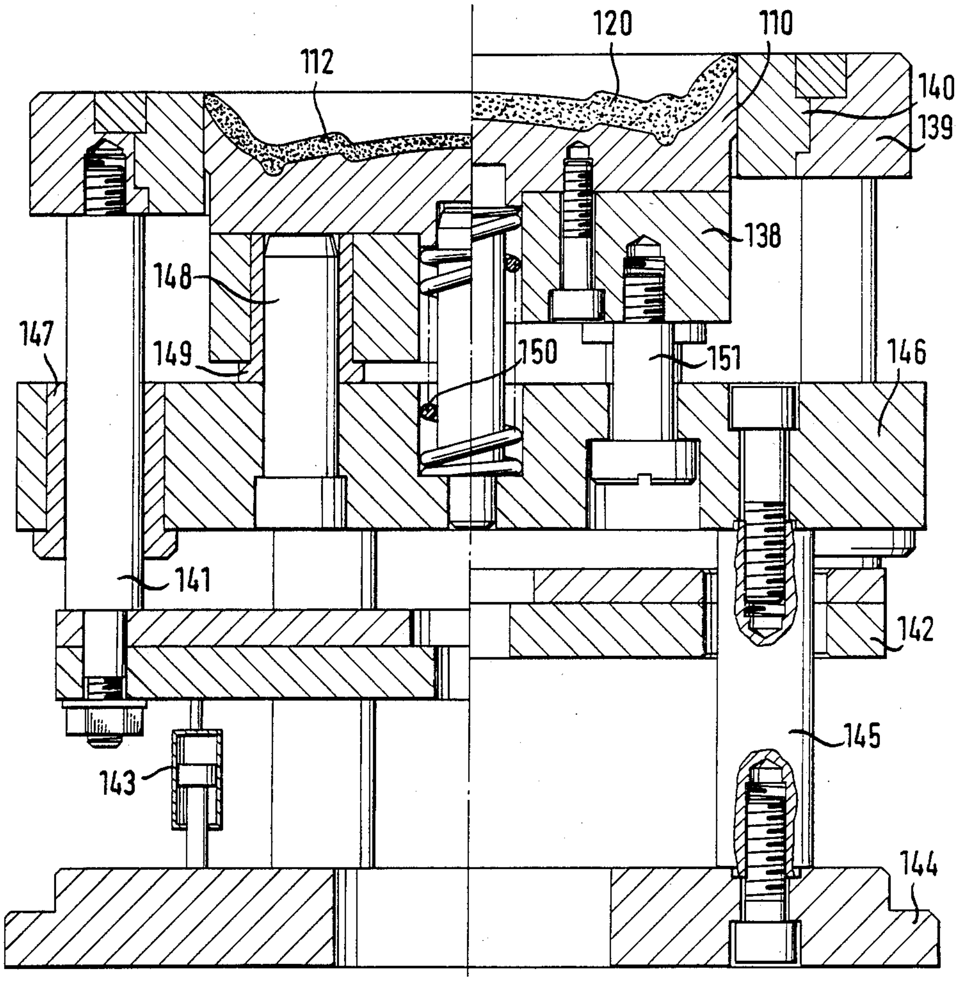

PROCESS AND APPARATUS FOR PRODUCING A DRY-PRESSED MOULDING FROM A PARTICULATE OR GRANULAR MOULDING MATERIAL

This is a continuation of application Ser. No. 666,886, filed Oct. 31, 1984, now abandoned.

BACKGROUND OF THE INVENTION

The present invention relates generally to a process and apparatus for producing a dry-pressed molding from a particulate or granular molding material, such as a ceramic molding composition. In particular the invention relates to a process of the type in which the molding composition is introduced into a loading cavity where it is premolded, then the premolded molding composition is pressed into the final shape of the molding by means of mutually oppositely moving halves of a molding press, the molding surface of each of which mold halves is substantially rigid or formed by an elastomeric layer which is supported during the final molding process in such a way as to be dimensionally rigid.

A process of this general type is known. In the known process, the loading cavity is formed by the two halves of a molding press which also constitute the final press in which the premolding is pressed into the final molding. In one known process for producing a round flat plate the halves of the molding press are arranged in such a way that the axis of the plate is essentially horizontal. The particulate or granular mold charge is introduced at an upper edge of the mold cavity and flows under the influence of gravity vertically downwards into the loading cavity. Once the loading cavity has been filled in this way the mold halves are moved towards each other and the molding receives its final shape. This known method is suitable for producing moldings where there are no large differences in wall thickness.

If the molding to be produced varies widely in wall thickness, as is the case for example with pieces of crockery with a pronounced base or a steep rim, it is difficult to obtain even an approximately uniform degree of compression within the molding because the mold halves, which are rigid, move towards each other during the pressing operation by the same distance across the entire area perpendicular to the direction of the pressing movement. If this pressing movement is assumed for example to be 1 cm, this means that at a point where the depth of the loading cavity is 2 cm (in the direction of pressing movement) before the molding, the linear compression ratio will be 2:1. By contrast, at a point where the depth of the same loading cavity is 4 cm in the pressing direction, the linear compression ratio will only be 4:3. Even though the ability of the molding composition to flow transversely of the pressing direction will have a certain averaging effect on the compression ratio between zones of differing loading cavity depths, it is nonetheless unavoidable that there will be differences in the degree of compression in the finished molding when the pressing is complete. On firing such a molding these differences in the degree of compression are the cause of uncontrollable deformations.

It is known to use so-called isostatic molding presses to obtain approximately consistent compression ratios. In isostatic molding presses at least one of the mold halves is lined with a resilient press membrane which, at rest, bears against a rigid supporting surface. The gap between the membrane and the rigid supporting surface is connected to a pressure fluid supply source so that, as the pressure is applied, the press membrane moves away from the supporting surface, producing an almost uniform compression in the molding composition as a result of the fact that the press membrane moves different distances at different zones, where the loading cavity has different depths. Isostatic molds and the associated presses and necessary hydraulic pressure sources are technically complicated and costly. Moreover, considerable skill is necessary to determine the required shape of the supporting areas of the press membrane so that the surface of the membrane facing into the mold cavity takes on a given desired shape during the pressing operation.

OBJECTS OF THE INVENTION

The primary object of the present invention is to provide a process which permits the production of moldings having a substantially uniform degree of compression over the whole area even if the wall thickness of the molding being formed (and therefore the depth of the loading cavity) is not uniform.

A secondary object of the present invention is to obtain the said substantially uniform degree of compression without recourse to isostatic molding techniques and the complicated and expensive molding equipment required thereby.

SUMMARY OF THE INVENTION

The present invention provides a process for producing a dry-pressed molding from a particulate or granular molding composition by introducing the molding composition into a loading cavity in such a way that a premolding is formed and subsequently pressing the premolding to form the finished molding by means of mutually oppositely moving halves of a molding press, the molding surface of each of the mold halves being substantially rigid or being formed by an elastomeric layer which is supported during the pressing operation so as to be dimensionally rigid, in which the loading cavity is formed by a first mold half and a vacuum shooting head, the loading cavity is evacuated through evacuating passages in the vacuum shooting head whilst the mold charge is being introduced, in such a way that the mold charge is precompressed to form a premolding which essentially retains its shape when the shooting head is subsequently removed from the first mold half; the shooting head is then removed from the first mold half, leaving the premolding behind in the first mold half; a second mold half is brought into alignment with the first mold half and the first and second mold halves are brought together in a final pressing operation to press the premolding to form the molding, the second mold half having a molding surface the shape of which determines the final shape of the molding and the shooting head having a molding surface which defines the shape of the premolding to be such that during the final pressing operation the molding surface of the second mold half comes into contact with the premolding in areas where the premolding is relatively thick in the pressing direction before it comes into contact with the premolding in areas where the premolding is relatively thin in the pressing direction.

The present invention also provides apparatus for producing a dry-pressed molding from a particulate or granular molding material by pressing a mold charge between first and second mold havles, of the type in which said first and second mold halves have respective molding surfaces which are substantially rigid or formed by an elastomeric layer which is supported during the pressing operation so as to be dimensionally rigid, said first and second mold halves being separable and a shooting head being positionable with said first mold half to form a loading cavity into which said mold charge can be introduced to form a premolding which is precompressed to sufficient strength to be self supporting when said shooting head is then removed to be replaced by said second mold half for a final pressing operation which is improved in that a molding surface on said shooting head defines, with said first mold half, the shape of said premolding, and the shape of said shooting head molding surface is different from the shape of said second mold half molding surface in such a way that during said final pressing operation said second mold half molding surface comes into contact with the surface of said premolding first in areas where said premolding is thickest in the pressing direction and subsequently in areas where said premolding is thinner in said pressing direction.

The reference hereinabove to the fact that if the molding surface of each mold half is not rigid, it may be formed by an elastomeric layer which during the press is supported so as to be effectively dimensionally rigid is intended to differentiate the present invention from isostatic pressing in which the press membrane defining part of the mold cavity, and which is generally likewise made of an elastomeric material, for example rubber, moves away from the dimensionally rigid supporting surface during the pressing operation and is then only supported by the pressure fluid injected between supporting surface and the press membrane itself and therefore not by a dimensionally rigid surface.

In the prior art dry-pressing method described in German Offenlegungsschrifts Nos. 3,101,236 and 3,128,348 the mold charge in a loading chamber defined by a first mold half and a shooting head is precompressed so as to produce a premolding sufficiently compressed to allow the shooting head to be removed and replaced by a second mold half for the final pressing. Using the process of the present invention the shooting head can now be constructed to have a molding surface which differs in shape from the molding surface of the second mold half, so that in the various zones of differing wall thickness of the molding the compression begins after the moving half of the molding press has moved forward by different amounts. The greater the wall thickness in an area of the molding being formed, the earlier in the pressing operation the compression of that area commences and conversely, the smaller the wall thickness the later in the pressing operation is the commencement of compression.

In this way it should theoretically be possible to obtain a substantially constant degree of linear compression in the pressing direction. In practice it will be necessary, with this new process, to allow for the fact that the mold charge has a certain transverse flow capacity which in itself tends to reduce the non-uniformity in the degree of compression. This transverse flow capacity must therefore be allowed for in determining the shape of the molding surface of the shooting head. If either or both of the mold halves is coated with an elastomeric layer, this must likewise be allowed for in the design of the supporting surface for the elastomeric layer, since the elastomeric layer will also cause the degree of compression to be more uniform over the area of the press molding.

As a rule, if either or both mold halves are coated with an elastomeric layer the degree of compression obtained using the process of the invention will be even more uniform than that obtained using mold halves having rigid molding surfaces. The wall thickness of the elastomeric layer is an additional parameter which can be varied across the molding surface with a view to obtaining the desired uniformity of compression. It must be borne in mind, however, that rigid molding surfaces have the advantage that the shape of the molding being formed is unambiguously defined by the molding surfaces.

The process according to the invention is suitable, in particular, for producing shaped articles from ceramic material, for example porcelain. As is stated in German Offenlegungsschrift No. 3,101,236, the disclosure of which is incorporated herein by reference, spraydried, granular porcelain material is highly suitable for use with a vacuum filling or loading method, provided that the risk of blocking up the air outlets from the loading cavity is limited, for example by the measures described in the above-mentioned German Offenlegungsschrift No. 3,101,236. However, the process of the present invention can also be used for processing dry, free-flowing metallic or coal-containing molding compositions, including, for example, molding sand as used in the making of metal-casting molds.

Other features and advantages of the present invention will become apparent from a study of the following description in which reference will be made to the accompanying drawings, given purely by way of non-limitative example.

BRIEF DESCRIPTION OF THE DRAWINGS

FIG. 3 is a sectional view illustrating the first mold half of FIG. 2 in cooperation with an associated second mold half.

DESCRIPTION OF THE PREFERRED EMBODIMENTS

Figure 1:
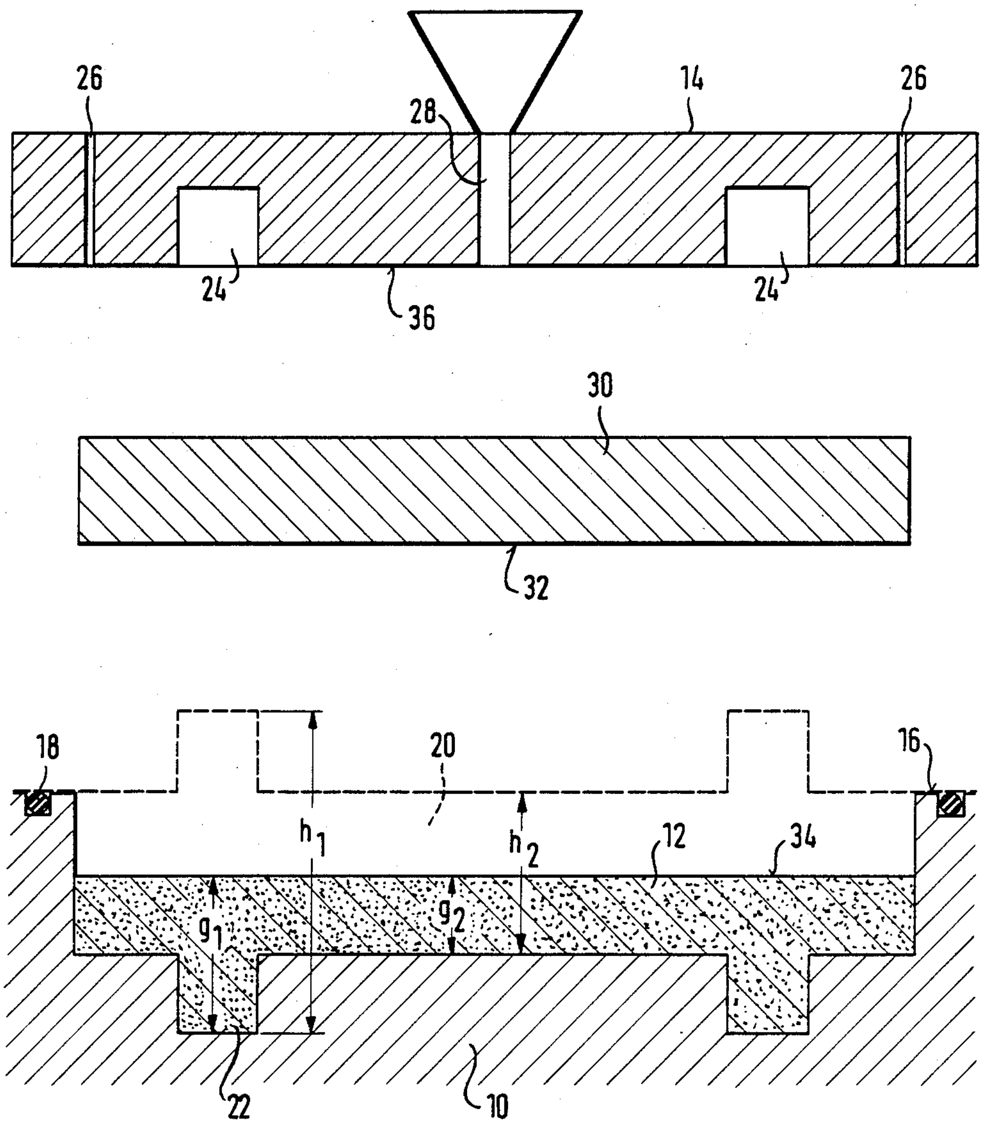
FIG. 1 is a schematic sectional view of a first mold half involved in the formation of a premolding and the finished molding, showing also the corresponding shooting head and the second mold half.

In FIG. 1, a first mold half is identified by the reference numeral 10. This first mold half is made of a rigid material and is shaped in such a way that it corresponds to the underside of a cake plate 12 with an annular base. In use of the apparatus this first mold half cooperates first with a shooting head 14, which is lowered onto an abutment surface 16 of the first compression mold half 10, so that a loading cavity 20 is formed sealed by a seal 18. This loading cavity 20 has a maximum depth of fill h1 in the annular zone where the annular base 22 is to be formed, and a general depth of fill h2 elsewhere. The maximum depth of fill h1 is twice that of the general depth of fill h2. This is obtained by providing the shooting head 14 with an annular recess 24 in the annular zone where the annular base 22 is to be formed, which leads to the formation of an upwardly directed annular ridge on the upper face of the premolding, the upper contour of which corresponds to the broken line in FIG. 1.

The loading cavity 20 is then evacuated through passages or ducts 26, and the mold charge is introduced through a charging passage 28. The filling operation, performed under vacuum is accompanied by a precompression such that the resulting premolding has the shape indicated by the broken line in FIG. 1. The shooting head 14 is then replaced by the second mold half 30, which fits into the first mold half 10. When the second mold half 30 is lowered, the first thing it comes into contact with is the upper annular ridge which was formed by the annular groove 24. The pressing operation is complete when the molding surface 32 of the second mold half 30 has reached the line 34, which corresponds to the upper face of the final molding. At this point the mold charge will have been compressed from $h_1$ to $g_1$ in the area of the annular base 22 and from $h_2$ to $g_2$ elsewhere. As $g_1 = \frac{1}{2}h_1$ and $g_2 = \frac{1}{2}h_2$, the molding 12 will have been substantially uniformly compressed throughout, with a linear compression ratio of 2:1. This is clearly a consequence of the fact that the shape of the molding surface 36 of the shooting head differs from that of the surface 32 of the second mold half 30 which defines the finished shape of one wall of the final molding; in fact this difference is such that the molding surface 32 of the second mold half 30 starts the pressing process in the area of the annular base 22 before pressing commences over the remainder of the area.

Figure 2:
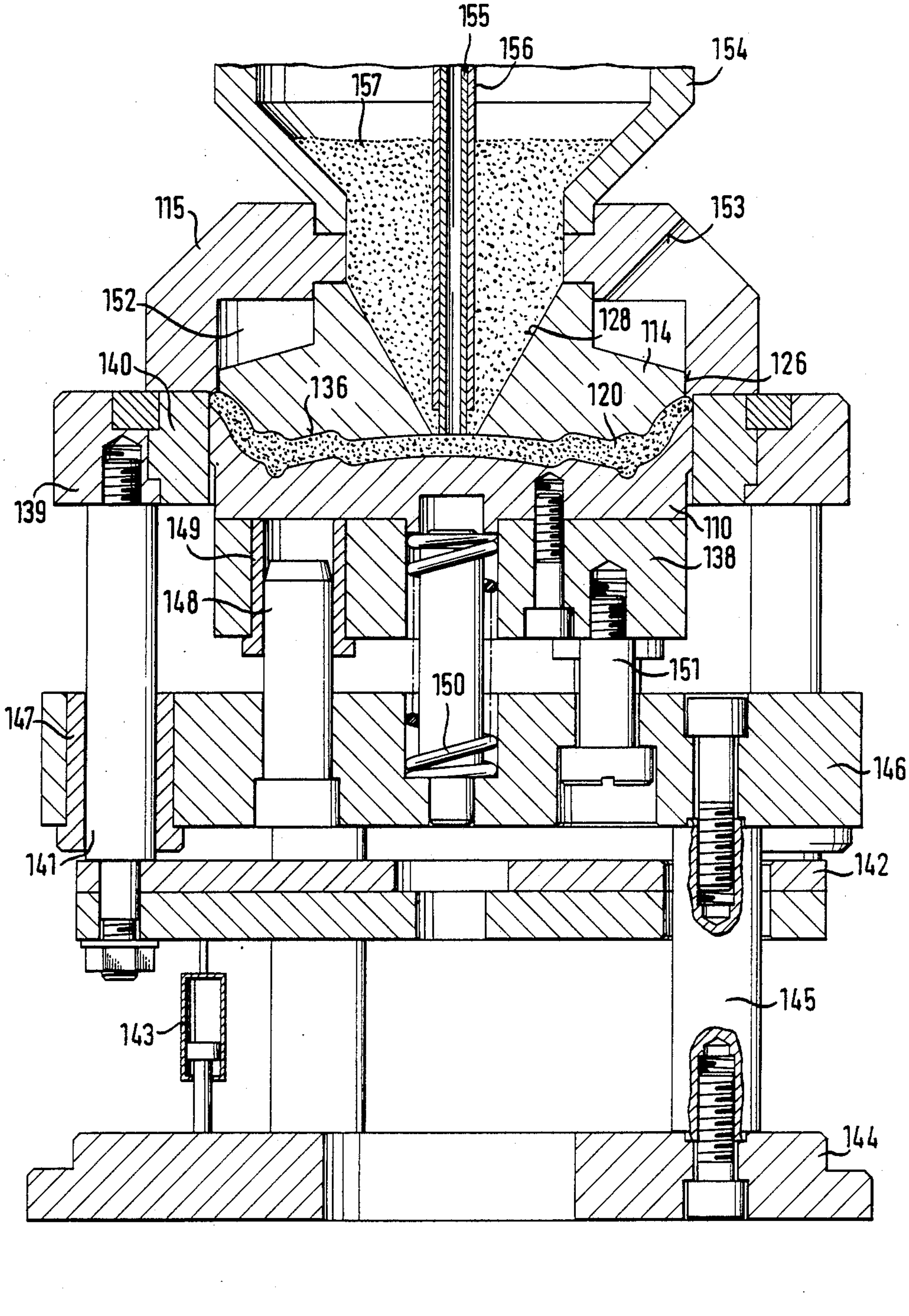
FIG. 2 is a schematic sectional view through apparatus for forming a plate, showing a first mold half and a shooting head in the relative positions adopted at the instant of filling a loading cavity.

In FIGS. 2 and 3 corresponding components are identified with the same reference numbers as are used in FIG. 1, except that the numbers have been increased by 100. The first mold half 110 is mounted on a support plate 138 and is guided in a frame 139 by means of a frame bush 140. The frame bush 140 is connected to a cross member 142 by way of guide pillars 141. The cross member 142 can be adjusted in height, by means of a hydraulic power system 143, relative to a lower base plate 144 which is connected to an upper base plate 146 by way of pressure columns 145. In the upper base plate 146 the guide pillars 141 are guided by means of guide bushes 147. The support plate 138 is guided on the upper base plate 146 by means of guide pins 148 which enter but do not pass through guide bushes 149. A pressure spring 150 bears at one end against the upper base plate 146 and acts at the other end on the first mold half 110. The distance between the first mold half 110 and the upper base plate 146 is limited at the upper end by a spacer bolt 151.

The shooting head 114 is housed in a shooting head housing 115 in such a way as to leave a small annular gap 126. The annular gap 126 communicates with an annular compartment 152 which in turn has an opening 153 for connection to an evacuating system (not shown). The annular gap 126 approximately follows the maximum circumference of the loading cavity 120 formed between the first mold half 110 and the shooting head 114. The shooting head 114 has a conical central filling hole 128 to which is connected a filling funnel 154. Centrally through the filling hole 128 passes a fluidising air supply tube 155 which is surrounded by a sealing sleeve 156 which can move up and down.

FIG. 2 illustrates the apparatus during the filling process. A vacuum is applied to the annular compartment 152 and hence also to the annular gap 126, so that the loading cavity 120 is evacuated. The sealing sleeve 156 has been raised, so that a mold charge 157 of a molding composition comprising spraydried particles can penetrate into the loading cavity 120 and there form a premolding the shape of which corresponds to that of the loading cavity 120. The vacuum 152 is set in such a way that the spray-dried particles of the mold charge are not broken up at the point where the annular gap 126 joins the loading cavity 120. In this way the particles of the mold charge form an air-permeable filter during the filling so that the evacuation of air from the loading cavity 120 can continue throughout the filling procedure. This filter is formed at the point where the annular gap 126 joins the loading cavity 120. On the other hand, the force of the evacuation is such that a partly compressed premolding forms in the course of the filling of the loading cavity 120 and retains its shape, particularly at the edge, even when the shooting head 114 is lifted off later.

In practice the shooting head 114 is mounted on the press head (not shown) of a hydraulic press (also not shown), and the lower base plate 144 is mounted on a base portion of the press. The shooting head 114 can also be moved horizontally relative to the press head, so that the shooting head 114 can be brought into alignment with the first mold half 110 and, after the filling process is complete, can be moved away in order to make room for a second mold half such as the mold half 130 shown in FIG. 3.

Referring now to FIG. 3, the right-hand half of the drawing shows the first mold half 110 and the associated parts in the positions they assume when the second mold half 130 has been lifted off, and the left-hand half of the drawing shows the first mold half 110 and the associated parts in the position they assume when the second mold half 130 is positioned on top of the first mold half 110 and seals off the loading cavity.

The second mold half 130 is carried by an upper portion support plate 159. The upper portion support plate 159 has guide pins 160 guided in guide bushes 161 of an upper portion base plate 162. The upper portion base plate 162 is fixed to attachment plate 163 which in turn is attached to the press head of the hydraulic press. The upper portion support plate 159 is biased by a compression spring 164 to be spaced from the upper portion base plate 162, the maximum possible spacing being determined by a spacer bolt 165. Attached to the upper portion support plate 159 are abutment stops 166, which, as the press head of the press moves downwards, act on the frame 139 and take this frame downwards as well, against the action of the hydraulic power system 143, so that the position of the frame 139 relative to the first mold half 110 initially stays the same.

When the second mold half 130 is moved down on the premolding 120 as shown in FIG. 3, the compression springs 150 and 164 are compressed up to a maximum determined by the end flanges of the guide bushes 149 and 161. This compression molding process has the effect of turning the premolding 120 shown in the right-hand half of FIG. 3 into the finished molding 112 shown in the left-hand half of FIG. 3. As soon as the pressing process has ended, the attachment plate 163 together with the press head of the press is raised and the compression springs 150 and 164 return to the relaxed state. The first mold half 110 returns into the position corresponding to the right-hand side of FIG. 3, but the frame 140, because of the action of the hydraulic power system 143, remains in the position corresponding to the left-hand half of FIG. 3, so that the molding 112 remains close to the top edge of the frame bushes 140 and can be picked up by receiving means, for example a suction head.

A comparison between FIGS. 2 and 3 shows how the shape of the area 136 of the shooting head 114 shown in FIG. 2, which forms the upper face of the loading cavity and determines the shape of upper face of the premolding differs from the molding surface 132 of the second mold half 130 shown in FIG. 3. In FIG. 3, on the right-hand side, the impression of the surface 136 of the shooting head 114 can be seen on the upper face of the premolding 120. The distance between the upper face of the premolding 120, shown in the right-hand half of FIG. 3, and the molding surface 132 of the second mold half is again variable over the mold area so that when the second mold half 130 is moved downward for the compression-molding stroke the process of compression begins in those areas where the wall thickness of the premolding 120 is greatest.

The process of the invention is of particular interest for producing non-circular, for example square, moldings which cannot be produced by traditional turning techniques.

The process of the invention can also be combined with the simultaneous application of a decorative motif to the molding being produced. For example, the decorative motif can be applied to the compressionmolding surface 32 or 132 of the second mold half 30 or 130 before each cycle or after a certain number of cycles have been completed and then transferred from the second mold half 30 or 130 to the molding being formed, as is described in detail in German Offenlegungsschrift No. 3,207,565. This combined application of a decorating process and the process of the invention is of particular interest because the success of the decorating process described in German Offenlegungsschrift No. 3,207,565 depends on minimising or eliminating the transverse drift of the molding composition during the final pressing, and this is precisely the effect achieved by the process of the invention.

What is claimed is:

1. A process for producing a dry-pressed final molding from a particulate or granular molding material comprising:

(a) providing a loading cavity (20) formed by a first mold half (10) and a vacuum shooting head (14), said first mold half (10) having a first mold half forming surface corresponding to the final form of a first face of the final molding, said vacuum shooting head (14) having a shooting head forming surface different from a corresponding second face of the final molding, said first mold half forming surface and said shooting head forming surfaces defining said molding cavity (20) and being separable from each other in a direction perpendicular to a plane of separation, said first mold half forming surface and said shooting head forming surface being substantially rigid or made of an elastomeric layer which is always rigidly supported by corresponding rigid supporting faces of said first mold half and said vacuum shooting head, respectively, said shooting head forming surface having recessed partial faces in areas opposed to recessed partial faces of said first mold half forming surface such that the ratio $h_1:g_1$, $h_2:g_2$ of the heights $h_1$, $h_2$ of said molding cavity in a direction perpendicular to said plane of separation with respect to the respective heights $g_1$, $g_2$ of the final molding to be produced being substantially constant over the plane of separation;

(b) applying a vacuum to said loading cavity by evacuating passage means (26) provided in said vacuum shooting head (14) such as to suck said granular molding material into said loading cavity (20) through loading channel means (28) defined by said shooting head (14), said sucked-in molding material filling said loading cavity completely and being precompressed such as to form a premold, said premold having the shape of said loading cavity and having oppositely directed projections corresponding to said recessed partial faces of said first mold half forming surface and said shooting head forming surface;

(c) removing said vacuum shooting head from said first mold half and leaving said premold behind in said first mold half;

(d) aligning a second mold half with said first mold half, said second mold half having a second mold half body and a second mold half forming surface corresponding to said second face of said final molding, said second mold half forming surface being a rigid face of said second mold half body or being made by an elastomeric layer supported by a rigid supporting face of said second mold half body;

(e) approaching said second mold half towards said first mold half body until the distance of said second mold half forming surface from said first mold half forming surface in a direction perpendicular to said plane of separation corresponds to the wall thickness of said final molding over the total surface of said plane of separation, said premold being engaged by said second mold half forming surface in the areas of increased wall thickness of said premold as defined by said projections before it is engaged in areas of reduced wall thickness, and said final molding being finally pressed exclusively by said approaching of said second mold half body towards said first mold half body said second mold half forming surface substantially evening said projection on said second face of said final molding.

2. The process of claim 1, wherein the shapes of said molding surfaces of said shooting head and of said second mold half are so chosen that an approximately constant compression ratio is obtained in the pressing direction over substantially the whole area of said molding in a plane generally perpendicular to said pressing direction.

3. The process of claim 1, wherein said loading cavity is evacuated through outlets leading to passages opening into said loading cavity at or adjacent the maximum circumference thereof, and said molding composition is introduced into said loading cavity at approximately the centre of this maximum circumference.

4. The process of claim 3, wherein the speed of impact of the molding composition particles on the boundary surfaces at or adjacent said outlets leading to said evacuating passages from said loading cavity is maintained within a range of values such that said particles pack around said outlets without becoming crushed and densely packed, whereby to form an air permeable packing which permits further evacuation during loading of said cavity.

5. Apparatus for producing a dry-pressed final molding having a first molding surface and an oppositely directed second molding surface in its final form from a particulate granular molding material comprising a first mold half and a vacuum shooting head disposed in opposed relation and forming a loading cavity (20) therebetween having a plane of separation, said first mold half having a first mold body and a first mold half forming surface with recessed partial faces corresponding to the final form of the first face of the final molding, said vacuum shooting head (14) having a shooting head body and a shooting head forming surface different from the corresponding final second face of the final molding in the final form thereof, said shooting head forming surface having recessed partial faces opposed to said recessed partial faces of said first mold half forming surface, said first mold half forming surface and said shooting head forming surface defining said loading cavity (20) and said shooting head being displaceable from said first mold half in a direction perpendicular to the plane of separation, said first mold half forming surface and said shooting head forming surface being rigid faces of said first mold half body and said shooting head body, respectively, or being made of an elastomeric layer which is rigidly supported by corresponding rigid supporting faces of said first mold half body and said shooting head body, respectively, said shooting head having a charge passage therethrough open to said loading cavity, means for applying a vacuum to said loading cavity for sucking the molding material into the loading cavity through said charge passage and to form a precompressed premold within said loading cavity, said premold having oppositely directed projections corresponding to said recessed partial faces of said first mold half forming surface and said shooting head forming surface, said shooting head being removable from said first mold half with the premold formed in the loading cavity being retained on said first mold half forming surface, a second mold half arranged to be aligned opposite said first mold half in place of said shooting head for pressing the premold into the final form, said second mold half having a second mold half body and a second molding half forming surface corresponding to the final form of the second molding surface of the final molding, said second mold half forming surface being substantially rigid or being made of an elastomeric material supported by a rigid supporting face on said second mold half body said second mold half forming surface being substantially free of recessed partial faces in the areas corresponding to said recessed partial faces of said shooting head forming surface, means for moving said second mold half body toward said first mold half body with the premold located in said first mold half forming surface and being contacted by the second mold half forming surface until the field of the distances between said second mold half forming surface and said first mold half surface in the direction perpendicular to the plane of separation corresponds to the field of thicknesses of the final molding whereby the premold is engageable by said second mold half forming surface with said projection on the face of said premold corresponding to said second face of said final molding before it engages the regions of the reduced wall thickness of said premold, the relationship of the heights $h_1$, $h_2$ of said loading cavity (20) in a direction perpendicular to said plane of separation to the corresponding heights $g_1$, $g_2$ between said first mold half forming surface and said second mold half forming surface in a direction perpendicular to said plane of separation at maximum approach of said second mold half body to said first mold half body being substantially constant over the total field defined by said first mold half forming surface within said loading cavity.

* * * * *